US009777633B1

(12) United States Patent
Nestico et al.

(10) Patent No.: US 9,777,633 B1
(45) Date of Patent: Oct. 3, 2017

(54) SECONDARY AIRFLOW PASSAGE FOR ADJUSTING AIRFLOW DISTORTION IN GAS TURBINE ENGINE

(71) Applicant: General Electric Company, Schenectady, NY (US)

(72) Inventors: Brian Francis Nestico, Loveland, OH (US); Brian K. Kestner, Cincinnati, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 15/084,966

(22) Filed: Mar. 30, 2016

(51) Int. Cl.
| | | |
|---|---|---|
| F02C 3/06 | (2006.01) | |
| B64D 27/10 | (2006.01) | |
| F02C 7/057 | (2006.01) | |
| F02C 3/14 | (2006.01) | |
| B64D 31/06 | (2006.01) | |

(52) U.S. Cl.
CPC .............. *F02C 7/057* (2013.01); *B64D 27/10* (2013.01); *B64D 31/06* (2013.01); *F02C 3/06* (2013.01); *F02C 3/14* (2013.01); *F05D 2210/44* (2013.01); *F05D 2220/323* (2013.01); *F05D 2270/102* (2013.01); *F05D 2270/3011* (2013.01); *F05D 2270/44* (2013.01); *F05D 2270/54* (2013.01)

(58) Field of Classification Search
CPC ... F02C 7/057; F02C 3/06; F02C 3/14; B64D 27/10; B64D 31/06
USPC ........................................................ 701/100
See application file for complete search history.

(56) References Cited

U.S. PATENT DOCUMENTS

| | | | |
|---|---|---|---|
| 3,392,585 A | 7/1968 | Bentz et al. | |
| 4,075,833 A | 2/1978 | Sargisson | |
| 5,284,012 A * | 2/1994 | Laborie ................. | B64D 33/08 244/53 B |
| 5,448,881 A | 9/1995 | Patterson et al. | |
| 6,169,496 B1 | 1/2001 | Martin et al. | |
| 6,231,306 B1 | 5/2001 | Khalid | |
| 7,637,455 B2 | 12/2009 | Silkey et al. | |
| 7,811,049 B2 | 10/2010 | Xu | |
| 7,827,803 B1 | 11/2010 | Wadia et al. | |
| 7,891,163 B2 * | 2/2011 | Richards ................. | F02C 7/052 60/226.1 |
| 8,514,103 B2 | 8/2013 | Maris | |
| 8,641,367 B2 | 2/2014 | Norris et al. | |
| 8,844,553 B2 | 9/2014 | Zysman et al. | |

(Continued)

*Primary Examiner* — Tan Q Nguyen
(74) *Attorney, Agent, or Firm* — Pamela A. Kachur

(57) ABSTRACT

Systems and methods for adjusting airflow distortion in a gas turbine engine using a secondary airflow passage assembly are disclosed. A gas turbine engine can include a compressor section, a combustion section, and a turbine section in series flow and defining at least in part an engine airflow path. A casing can enclose the gas turbine engine and be at least partially exposed to a bypass airflow. The gas turbine engine can further include a secondary airflow passage assembly comprising a door and a duct, the duct defining an inlet located on the casing, the duct defining an outlet in airflow communication with the engine airflow path, the duct comprising an airflow passage extending between the inlet and outlet. The door can be moveable between an open and closed position to allow a portion of the bypass airflow to flow through the airflow passage to adjust airflow distortion.

20 Claims, 9 Drawing Sheets

(56) References Cited

U.S. PATENT DOCUMENTS

| | | |
|---|---|---|
| 9,194,301 B2 | 11/2015 | Parente |
| 2014/0093350 A1 | 4/2014 | Meisner et al. |
| 2014/0303832 A1 | 10/2014 | Skertic |
| 2016/0326903 A1* | 11/2016 | Xu ......................... F01D 25/12 |

* cited by examiner

SECONDARY AIRFLOW PASSAGE FOR ADJUSTING AIRFLOW DISTORTION IN GAS TURBINE ENGINE

FIELD OF THE INVENTION

The present subject matter relates generally to gas turbine engines and more particularly to a secondary airflow passage for adjusting airflow distortion in a gas turbine engine.

BACKGROUND OF THE INVENTION

A gas turbine engine generally includes a core having, in serial flow order, a compressor section, a combustion section, a turbine section, and an exhaust section. During operation, an engine airflow is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the compressor section and is then routed through the exhaust section, e.g., to atmosphere.

During operation, the gas turbine engine may encounter airflow distortion in the engine airflow path upstream of the compressor section, such as a circumferential or local flow disruption due to the angle of attack of the gas turbine engine, a cross wind, or any other inlet anomaly. Airflow distortion can be so uneven during operation as to put portions of the compressor section at or below proper stall pressure ratios. In many cases, sufficient stall margin should be maintained in the compressor section in order to prevent stall conditions from occurring during operation of the gas turbine engine.

One approach to maintaining a desired stall margin in a gas turbine engine is to close the variable guide vanes at the inlet to the compressor section, thereby reducing air flow and pressure in the compressor section below a pressure sufficient to cause stall conditions. However, closing the variable guide vanes can decrease the overall efficiency of the gas turbine engine.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a core engine of a gas turbine engine. The core engine can include a compressor section, a combustion section, and a turbine section in series flow and defining at least in part an engine airflow path for the gas turbine engine. The core engine can also include a casing at least partially enclosing the compressor section, combustion section, and turbine section of the core engine. The casing can be at least partially exposed to a bypass airflow. The core engine can also include a secondary airflow passage assembly. The secondary airflow passage assembly can include a duct and a door. The duct can define an inlet located on the casing and an outlet in airflow communication with the engine airflow path. The duct can further define an airflow passage extending between the inlet and outlet. The door can be moveable between an open position and a closed position. The door can allow at least a portion of the bypass airflow to flow through the airflow passage when in the open position and restrict substantially all airflow through the airflow passage when in the closed position.

Another example aspect of the present disclosure is directed to a method for adjusting airflow distortion in a gas turbine engine. The gas turbine engine can include a compressor section, a combustion section, and a turbine section in series flow. The compressor section, combustion section, and turbine section can define at least in part an engine airflow path. The compressor section, combustion section, and turbine section can be at least partially enclosed in a casing. The casing can be at least partially exposed to a bypass airflow. The method includes determining, by one or more control devices, an airflow distortion condition associated with the engine airflow path. The method can also include controlling, by the one or more control devices, a door of a secondary airflow passage to adjust the airflow distortion condition of the gas turbine engine. The secondary airflow passage assembly can include a duct. The duct can define an inlet located on the casing and an outlet in airflow communication with the engine airflow path. The duct can further define an airflow passage extending between the inlet and outlet. The door can allow at least a portion of the bypass airflow to flow through the airflow passage when in the open position and restrict substantially all airflow through the airflow passage when in the closed position.

Other example aspects of the present disclosure are directed to gas turbine engines, devices, apparatus, and other systems configured to adjust airflow distortion in the airflow path of a gas turbine engine. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
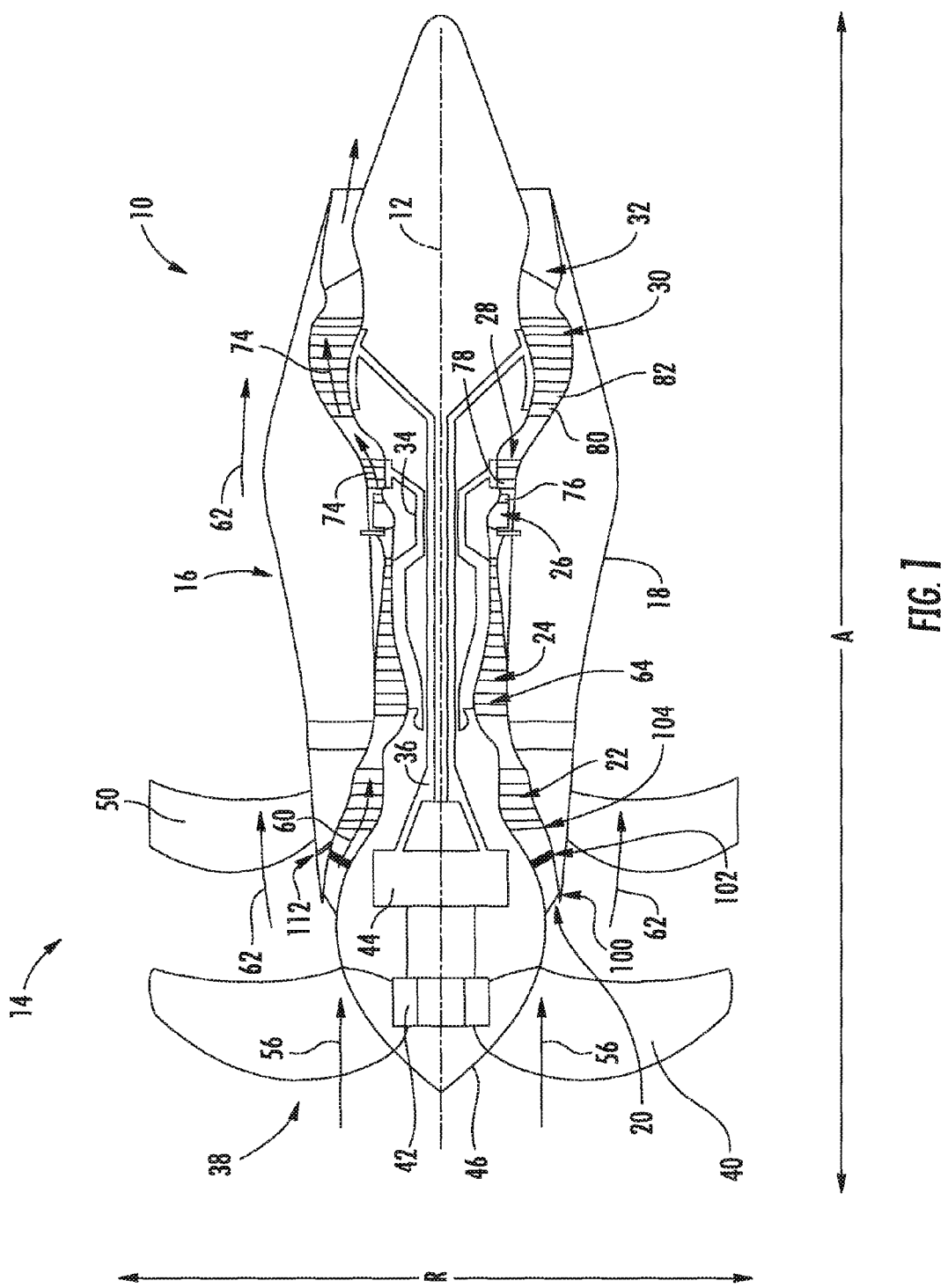
FIG. 1 is a schematic, cross-sectional view of a gas turbine engine according to example embodiments of the present subject matter.

Reference now will be made in detail to embodiments of the present disclosure, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the present disclosure. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to adjusting airflow distortion in a gas turbine engine in real-time. Airflow distortion can be so uneven during operation of the gas turbine engine as to put portions of the compressor section at or below proper stall pressure ratios, thereby reducing the operability of the gas turbine engine. Increased stall margin headroom can therefore be necessary to account for airflow distortion. One method for increasing stall margin headroom is to close the variable guide vanes at the inlet to the compressor section, thereby reducing air pressure and air flow in the compressor section of the gas turbine engine. However, closing the variable guide vanes to increase stall margin headroom can decrease the overall efficiency of the gas turbine engine.

The gas turbine engine and method according to example aspects of the present disclosure can increase the operability of the aircraft's gas turbine engine by making a real-time assessment of airflow distortion in the engine airflow path of the gas turbine engine and adjusting the airflow distortion in the engine airflow path by operating one or more secondary airflow passage assemblies to route air from a bypass airflow into the engine airflow path of the gas turbine engine based on the airflow distortion assessment. Real-time pressure measurements obtained from the engine airflow path can be used to make an assessment of distortion conditions in the engine airflow path of the gas turbine engine. Airflow distortion in a particular area of the engine airflow path, such as local flow separation, can then be adjusted by opening or closing one or more doors of one or more secondary airflow passage assemblies to route air from a bypass airflow from outside of the gas turbine engine into the engine airflow path to energize areas experiencing airflow distortion. By adjusting the airflow distortion in the engine airflow path, the operability of the gas turbine engine can be improved.

According to particular aspects of the present disclosure, a plurality of secondary airflow passage assemblies can be included in a gas turbine engine. The gas turbine engine can include a core engine, which can include a compressor section, a combustion section, and a turbine section in serial flow order, and enclosed by a casing. An engine airflow can enter the core engine through an inlet of the compressor section and flow through the core engine through an engine airflow path.

Each secondary airflow passage assembly can include an inlet located on the casing of the gas turbine engine and an outlet located within the core engine in airflow communication with the engine airflow path. A duct, or airflow passage, can extend between the inlet and outlet. A door located in close proximity to the inlet on the casing can be controlled to open and close. When the door is closed, substantially all airflow through the airflow passage is restricted. When the door is opened, a portion of a bypass airflow from outside the core engine can enter the airflow passage and flow into the engine airflow path. In one embodiment, the door can move generally along an axial direction into a compartment in the casing. In another embodiment, the door can extend into the bypass airflow to direct air into the airflow passage.

Each secondary airflow passage assembly can be controlled to route bypass airflow from outside the core engine into the engine airflow path in response to airflow distortion. For example, in one embodiment, one or more pressure sensing devices can be integrated into various components that extend into the engine airflow path of the gas turbine engine. The pressure sensing devices can be configured to take pressure measurements associated with each secondary airflow passage assembly. A distortion condition assessment can be made based on the real-time pressure measurements obtained from the pressure sensing devices. For example, a non-uniform pressure profile across the engine airflow path can indicate that airflow distortion is present in the engine airflow path. One or more secondary airflow passage assemblies can then be controlled to adjust the airflow distortion associated with the engine airflow path. For example, a secondary airflow passage assembly can be controlled to route a portion of the bypass airflow into an area of the engine airflow path experiencing local flow separation to energize that area of the engine airflow path and mitigate the local flow separation.

In this way, the gas turbine engine and method according to example aspects of the present disclosure can have a technical effect of adjusting the airflow distortion of the gas turbine engine based on real-time airflow distortion conditions. Further, this can allow an increase in the operability of the gas turbine engine by increasing the stall margin headroom available for operational safety.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an example embodiment of the present disclosure. More particularly, for the embodiment of FIG. 1, the gas turbine engine is a high-bypass turbofan jet engine 10, referred to herein as "gas turbine engine 10." Example aspects of the present disclosure can be used with other suitable gas turbine engines without deviating from the scope of the present disclosure.

As shown in FIG. 1, the gas turbine engine 10 defines an axial direction A (extending parallel to a longitudinal centerline 12 provided for reference) and a radial direction R. The gas turbine engine 10 also defines a circumferential direction (not depicted). In general, the gas turbine engine 10 includes a fan section 14 and a core engine 16, the fan section 14 configured in mechanical communication and positioned in flow communication with the core engine 16.

The example core engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. The fan blades 40 and disk 42 are together rotatable about the longitudinal centerline 12 by LP shaft 36 across a power gear box 44. The power gear box 44 includes a plurality of gears for adjusting the rotational speed of the LP shaft 36. Additionally, for the embodiment depicted, the disk 42 of the variable pitch fan 38 is covered by a rotatable front hub 46 aerodynamically contoured to promote an airflow through the plurality of fan blades 40.

Referring still to the example gas turbine engine 10 of FIG. 1, the example gas turbine engine 10 additionally includes a plurality of circumferentially-spaced outlet guide vanes 50. The plurality of outlet guide vanes 50 are positioned downstream from the fan 38 along the axial direction A and extend outwardly from the outer casing 18 of the core engine 16 generally along the radial direction R. Each outlet guide vane 50 defines a center of pressure 52 (shown in FIG. 2) and a pitch axis P extending substantially parallel to the radial direction R. Notably, for the embodiment depicted, the gas turbine engine 10 does not include any outer casing enclosing the fan section 14 and/or outlet guide vanes 50. Accordingly, for the embodiment depicted, the gas turbine engine 10 may be referred to as an un-ducted single fan gas turbine engine 10.

For the example gas turbine engine 10 depicted, the fan section 14, or more particularly, the rotation of the fan blades 40 of the fan section 14, provides a majority of the propulsive thrust of the gas turbine engine 10. Additionally, the plurality of outlet guide vanes 50 are provided to increase an efficiency of the fan section 14 as well as to provide other benefits, such as, for example, decreasing an amount of noise generated by the gas turbine engine 10.

During operation of the gas turbine engine 10, a volume of air 56 passes over the plurality of blades 40 of the fan section 14. A first portion of the volume of air 56, i.e., the first portion of air 60, is directed or routed into an engine airflow path 64 extending through the compressor section, the combustion section 26, the turbine section, and the exhaust section 32. The first portion of air 60 may also be referred to as an engine airflow. Additionally, a second portion of the volume of air 56, e.g., a second portion of air 62, flows around the core engine 16, bypassing the core engine 16. The second portion of air 62 may also be referred to as a bypass airflow. The ratio between the second portion of air 62 and the first portion of air 60 is commonly known as a bypass ratio.

Referring still to FIG. 1, the pressure of the first portion of air 60 is increased as it is routed through the LP compressor 22 and subsequently through the HP compressor 24. The compressed first portion of air 60 is then provided to the combustion section 26, where it is mixed with fuel and burned to provide combustion gases 74. The combustion gases 74 are routed through the HP turbine 28 where a portion of thermal and/or kinetic energy from the combustion gases 74 is extracted via sequential stages of HP turbine stator vanes 76 that are coupled to the outer casing 18 and HP turbine rotor blades 78 that are coupled to the HP shaft or spool 34, thus causing the HP shaft or spool 34 to rotate, thereby supporting operation of the HP compressor 24. The combustion gases 74 are then routed through the LP turbine 30 where a second portion of thermal and kinetic energy is extracted from the combustion gases 74 via sequential stages of LP turbine stator vanes 80 that are coupled to the outer casing 18 and LP turbine rotor blades 82 that are coupled to the LP shaft or spool 36, thus causing the LP shaft or spool 36 to rotate, thereby supporting operation of the LP compressor 22 and/or rotation of the fan 38. The combustion gases 74 are subsequently routed through the jet exhaust nozzle section 32 of the core engine 16 to provide propulsive thrust to supplement propulsive thrust provided by the fan section 14.

Referring still to FIG. 1, downstream of an annular inlet 20 is one or more inlet guide vanes 100. In certain example embodiments, inlet guide vane 100 may be configured to open or close, thereby restricting the flow of the first portion of air 60 into the engine airflow path 64 extending through the compressor section. In certain example embodiments, inlet guide vane 100 can be an instrumented guide vane 400 according to example embodiments of the present disclosure as depicted, for instance, in FIGS. 6 and 7.

Downstream of inlet guide vane 100 is one or more struts 102 configured to mechanically couple outer casing 18 to the core engine 16. Strut 102 extends into the engine airflow path 64 where first portion of air 60 flows over strut 102. In certain example embodiments, strut 102 is configured to obtain pressure measurements. Downstream of strut 102 is one or more variable guide vanes 104. Variable guide vanes 104 are configured to open or close, thereby restricting the flow of the first portion of air 60 into the engine airflow path 64 extending through the compressor section. In certain example embodiments, variable guide vane 104 can be an instrumented variable guide vane 400 according to example embodiments of the present disclosure as shown, for instance, in FIGS. 6 and 7.

Referring still to FIG. 1, a secondary airflow passage assembly 112 is located on a forward end of gas turbine engine 10. In one embodiment, secondary airflow passage assembly 112 can be opened to allow at least a portion of second portion of air 62 to flow into the engine airflow path 64 to improve the operability of gas turbine engine 10, increase the stall margin of LP compressor 22, or mitigate airflow mismatch between LP compressor 22 and HP compressor 24.

Figure 2:
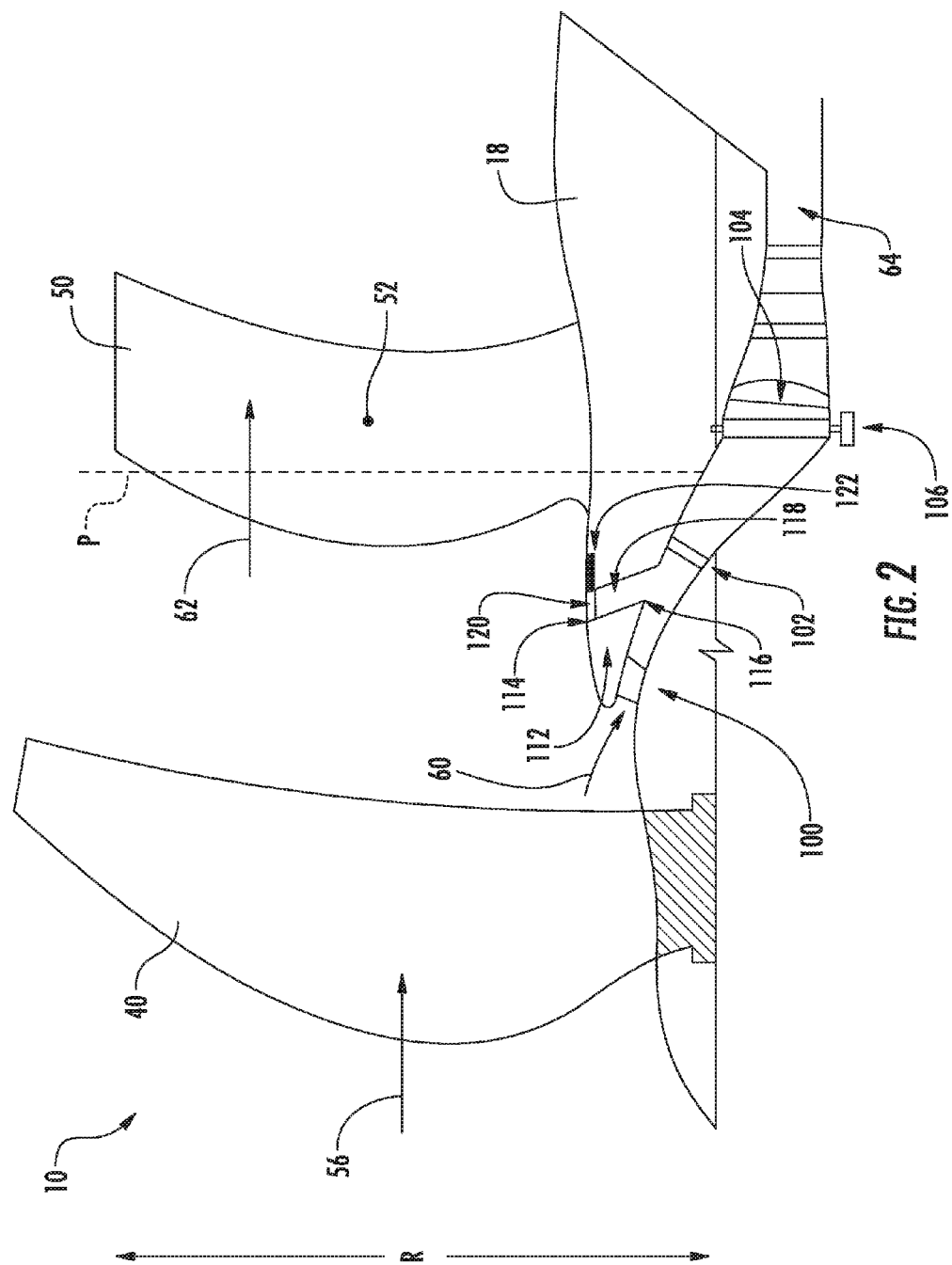
FIG. 2 is schematic, cross-sectional view of a forward end of an example gas turbine engine according to example embodiments of the present disclosure.
Figure 3:
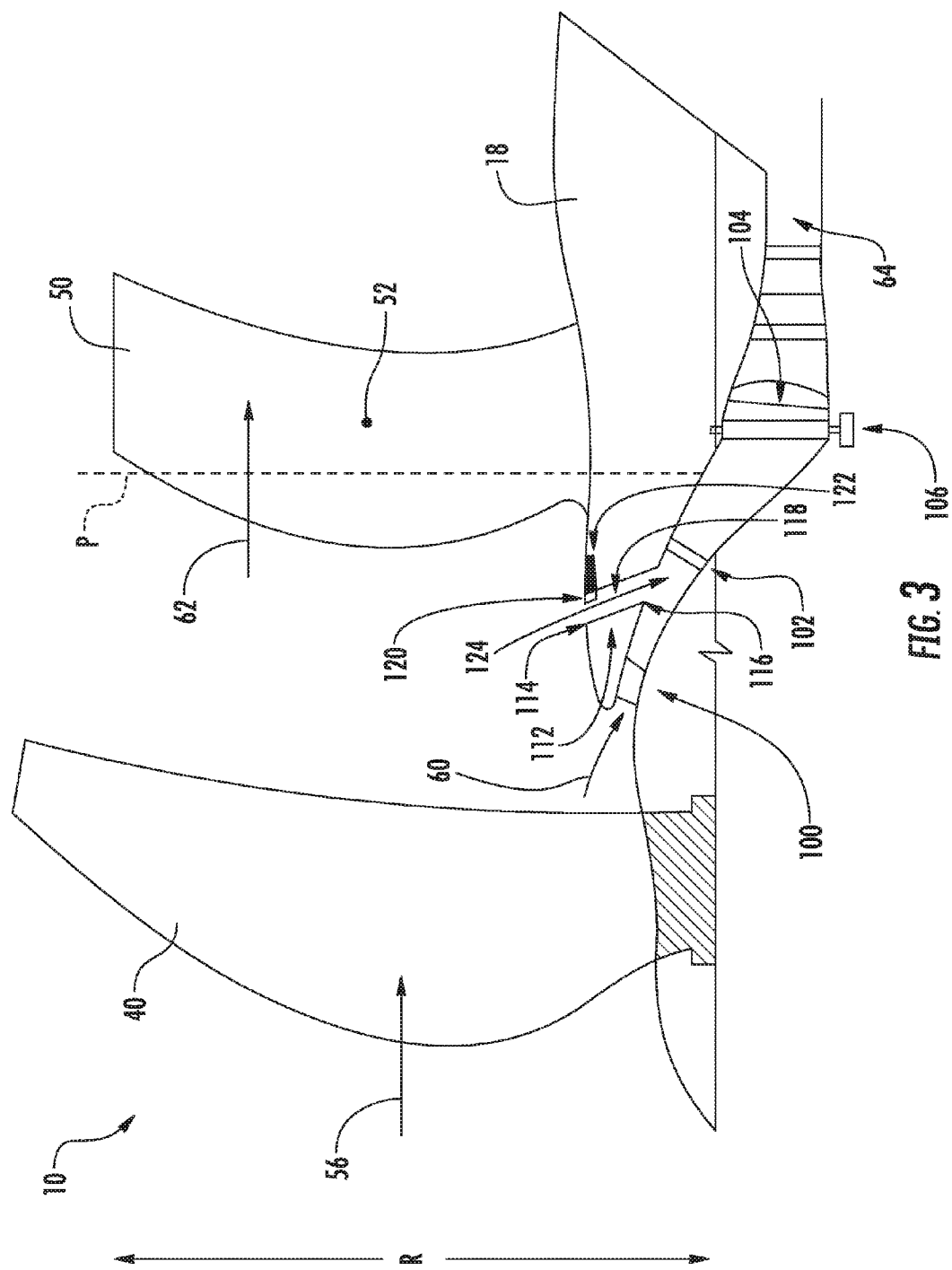
FIG. 3 is schematic, cross-sectional view of a forward end of an example gas turbine engine according to example embodiments of the present disclosure.

Referring now to FIGS. 2 and 3, a close-up, cross-sectional view of the forward end of the example gas turbine engine 10 of FIG. 1 according to example aspects of the present disclosure is shown. As shown, the gas turbine engine 10 includes at least one control mechanism 106 configured to adjust a variable guide vane 104. In certain example embodiments, the gas turbine engine 10 may include a plurality of control mechanisms 106, each individual control mechanism 106 configured to adjust an individual variable guide vane 104 or other member of the airflow path.

Referring still to FIGS. 2 and 3, secondary airflow passage 112 can include an inlet 114 located on outer casing 18. As shown in FIGS. 2 and 3, outer casing 18 can be exposed to second portion of air 62. Secondary airflow passage assembly 112 can also include an outlet 116 in airflow communication with engine airflow path 64. Secondary airflow passage assembly 112 can also include an airflow passage 118 extending between inlet 114 and outlet 116. Secondary airflow passage assembly 112 can also include a door 120, which can be moved by one or more actuators 122. In an example embodiment, door 120 can be moved in response to a signal from a control device, such as, for instance, control device 800 depicted in FIG. 8.

As illustrated in FIGS. 2 and 3, in some embodiments, door 120 can be moved at least partially along axial direction A between an open position and a closed position. For example, as shown in FIG. 2, door 120 is in a closed position, and can move substantially along axial direction A into an open position, as depicted in FIG. 3. In the closed position, door 120 restricts substantially all airflow through airflow passage 118. As depicted in FIG. 3, door 120 can be opened such that at least a portion 124 of the second portion of air 62 can enter inlet 114, travel through airflow passage 118, and exit outlet 116 into the engine airflow path 64. In another embodiment not shown in FIGS. 2 and 3, door 120 can be adjusted to one or more intermediate positions such that the portion 124 of airflow is less than the portion 124 of airflow in the open position, but more than the portion of airflow 124 in the closed position. In an embodiment, door 120 can be moved in response to control signals, such as a control signal sent to actuator 122 that controls actuator 122 to move door 120 to a particular setpoint, such as the open, closed, or intermediate positions. In this way, the amount of airflow that flows through airflow passage 118 can be varied.

Figure 4:
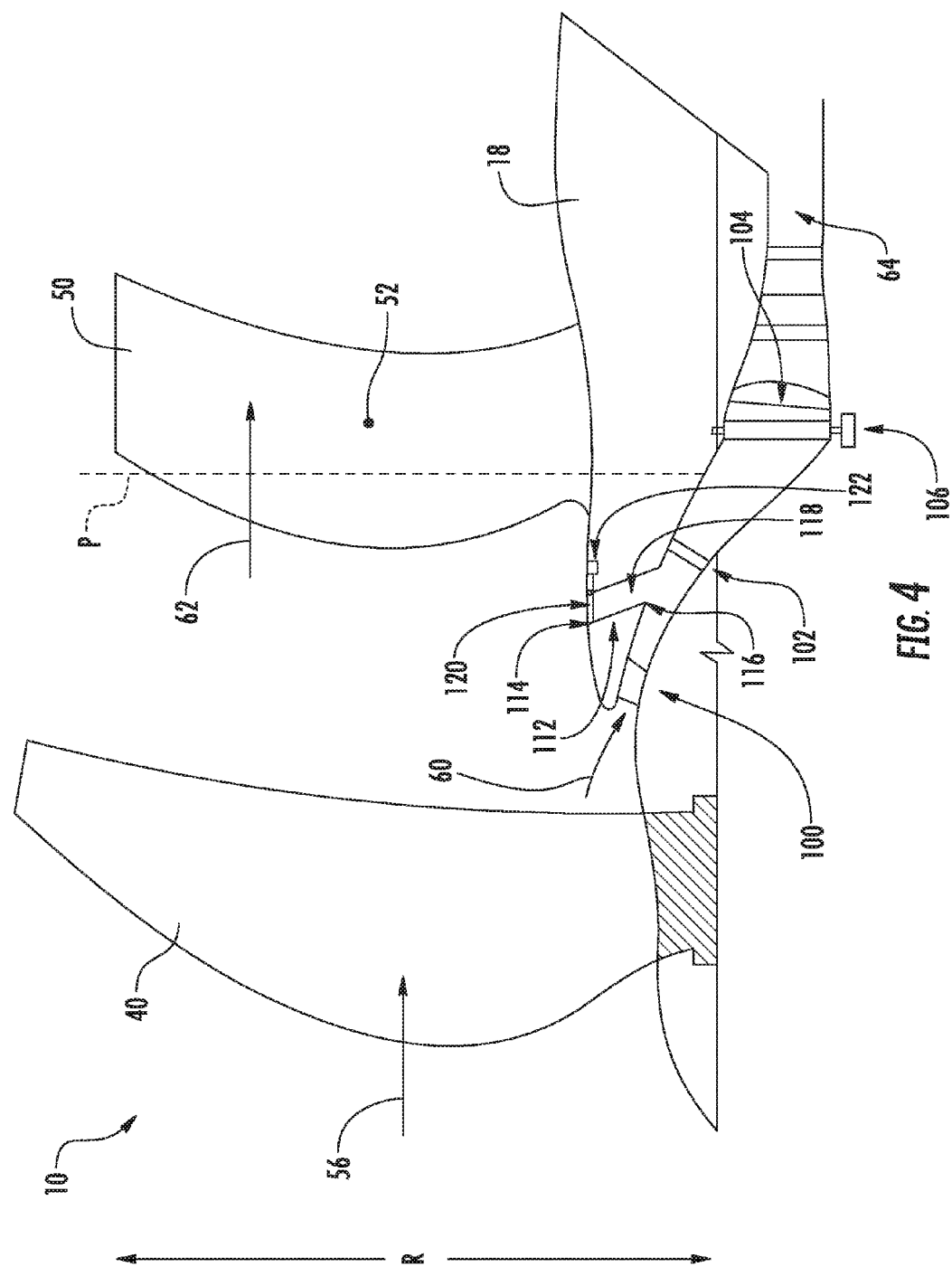
FIG. 4 is schematic, cross-sectional view of a forward end of an example gas turbine engine according to example embodiments of the present disclosure.
Figure 5:
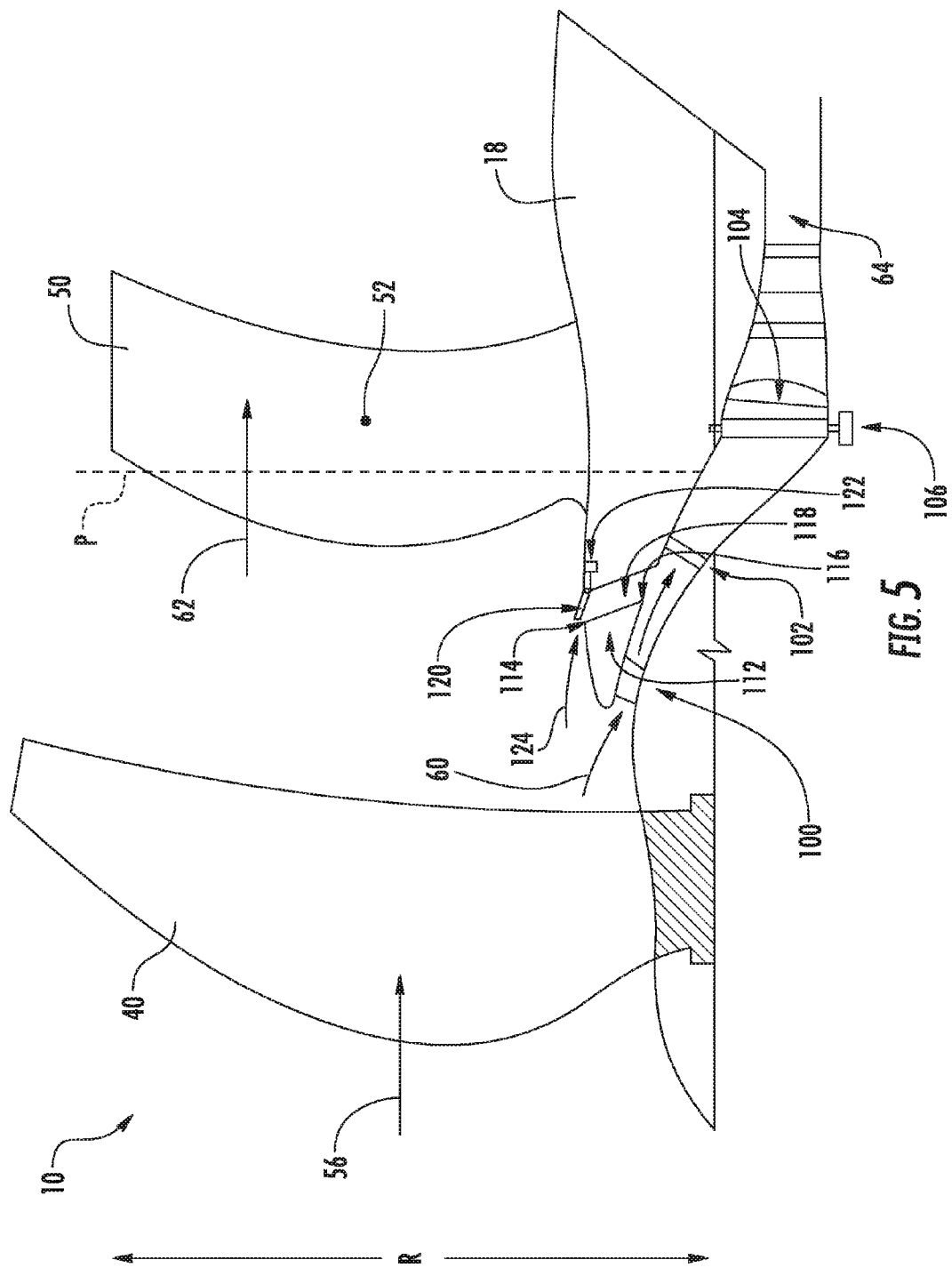
FIG. 5 is schematic, cross-sectional view of a forward end of an example gas turbine engine according to example embodiments of the present disclosure.

Referring now to FIGS. 4 and 5, the same forward end of gas turbine engine 10 depicted in FIGS. 2 and 3 is shown according to additional example aspects of the present disclosure. Structures that are the same or similar to those shown in FIGS. 2 and 3 are referred to with the same reference numerals. As illustrated in FIGS. 4 and 5, in some embodiments, secondary airflow passage assembly 112 can include a door configured to extend into the airflow path of the second portion of air 62. As depicted in FIGS. 4 and 5, in some embodiments, secondary airflow passage 112 can include an inlet 114 located on outer casing 18. As shown in FIGS. 4 and 5, outer casing 18 can be exposed to second portion of air 62. Secondary airflow passage assembly 112 can also include an outlet 116 in airflow communication with engine airflow path 64. Secondary airflow passage assembly 112 can also include an airflow passage 118 extending between inlet 114 and outlet 116. Secondary airflow passage assembly 112 can also include a door 120, which can be moved by one or more actuators 122. In an example embodiment, door 120 can be moved in response to a signal from a control device, such as, for instance, control device 800 depicted in FIG. 8.

As illustrated in FIGS. 4 and 5, in some embodiments, door 120 can be moved between an open position and a closed position, wherein door 120 extends into the flow of second portion of air 62 when door 120 is in the open position. For example, as shown in FIG. 4, door 120 is in a closed position, and restricts substantially all airflow through airflow passage 118. As shown in FIG. 5, door 120 can be moved to an open position such that at least a portion 124 of the second portion of air 62 can enter inlet 114, travel through airflow passage 118, and exit outlet 116 into the engine airflow path 64. In another embodiment not shown in FIGS. 4 and 5, door 120 can be adjusted to one or more intermediate positions such that the portion 124 of airflow is less than the portion 124 of airflow in the open position, but more than the portion of airflow 124 in the closed position. In an example embodiment, door 120 can be moved in response to control signals, such as a control signal sent to actuator 122 that controls actuator 122 to move door 120 to a particular set point, such as the open, closed, or intermediate positions. In this way, the amount of airflow that flows through airflow passage 118 can be varied.

Referring generally to FIGS. 2-5, during operation of gas turbine engine 10, a door 120 of a secondary airflow passage 112 can be configured to be controlled to adjust airflow distortion in engine airflow path 64. For instance, a control device, such as control device 800 shown in FIG. 8, can obtain measurements from the one or more pressure sensor devices, and determine that an area of the engine airflow path is experiencing airflow distortion, such as airflow separation. The control device can then control a secondary airflow passage assembly 112 to adjust the airflow distortion, by, for example, sending a control signal to actuator 122 to open or close door 120 to allow a portion 124 of air from the second portion of air 62 to flow through airflow passage 118 into engine airflow path 64. In this way, airflow distortion in a gas turbine engine can be adjusted, and moreover, reduced, thereby improving operability of the gas turbine engine.

Figure 6:
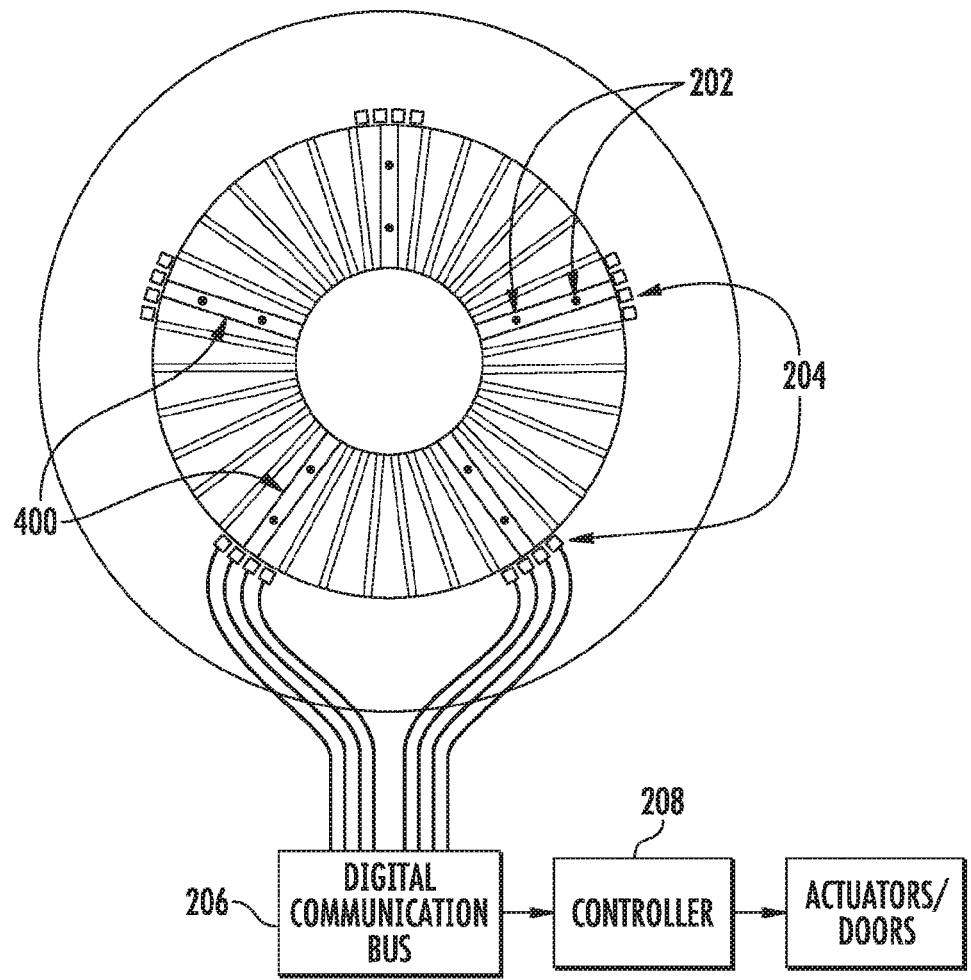
FIG. 6 is a schematic, axial view of an array of instrumented guide vanes in an example gas turbine engine according to example embodiments of the present disclosure.
Figure 7:
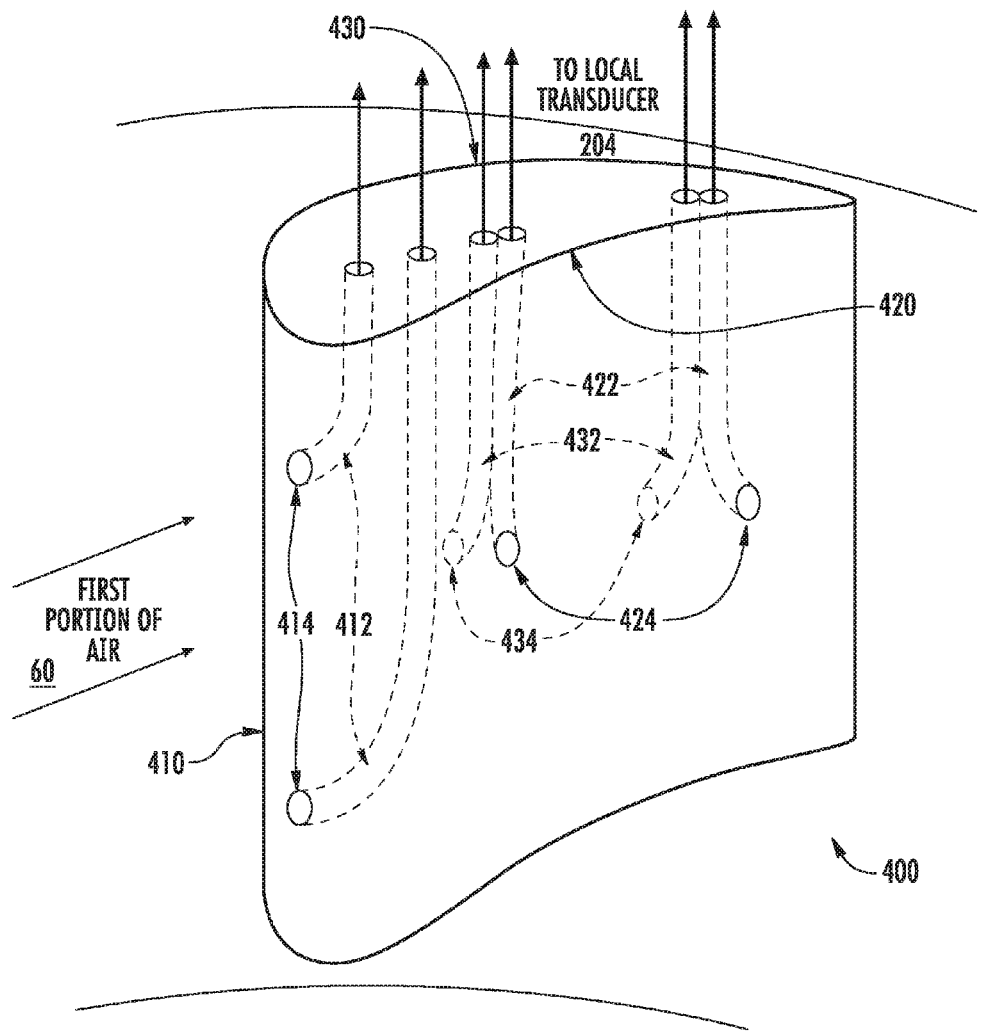
FIG. 7 is a schematic of an individual instrumented guide vane in an example gas turbine engine according to example embodiments of the present disclosure.

In one embodiment, one or more pressure sensor devices can be located at least partially within engine airflow path 64. In an embodiment, the one or more pressure sensor devices can be at least partially integrated into one or more members in the engine airflow path 64, such as an instrumented guide vane 400 as shown in FIGS. 6 and 7. In another embodiment, the one or more pressure sensor devices can be integrated into inlet guide vane 100 or strut 102. Other pressure sensor devices can also be used without departing from the scope or spirit of the present disclosure. Using measurements obtained by the one or more pressure sensor devices, an airflow distortion assessment can be determined.

Additionally, in another example embodiment, a plurality of secondary airflow passage assemblies 112 can be spaced about the circumferential direction of gas turbine engine 10. In an embodiment, each secondary airflow passage assembly 112 can be associated with one or more pressure sensing devices. For example, gas turbine engine 10 can include a plurality of instrumented guide vanes 400 spaced about the circumferential direction of gas turbine engine 10 as depicted in FIG. 6. Each secondary airflow passage assembly 112 can have one or more instrumented guide vanes 400 associated with each secondary airflow passage assembly 112 such that the one or more instrumented guide vanes 400 can obtain measurements from the engine airflow path 64 in close proximity to each secondary airflow passage assembly 112. Using measurements obtained by the pressure sensor devices, an airflow distortion assessment can be made. For example, a non-uniform pressure profile across the circumferential direction of the engine airflow path could indicate that airflow distortion is present in a particular area of engine airflow path 64. One or more doors 120 of one or more secondary airflow passage assemblies 112 can then be controlled to allow a portion 124 of air from second portion of air 62 to flow into the areas experiencing airflow distortion, thereby mitigating the airflow distortion.

Referring now to FIG. 6, a schematic, axial view of an array of individual guide vanes 104 in the example gas turbine engine 10 of FIG. 1 is shown. As shown, a plurality of individual guide vanes 104 are configured in a circumferential array located in the engine airflow path 64 upstream of the LP Compressor 22. As depicted in FIG. 6, five instrumented guide vanes 400, as discussed below in greater detail with respect to FIG. 7, are included in the array of individual guide vanes 104. As will be discussed in greater detail below with reference to FIG. 7, each individual instrumented guide vane 400 is configured with a pressure sensing device. As shown in FIG. 6, the pressure sensing device includes one or more taps 202 extending through the individual instrumented guide vane 400 and one or more local transducers 204 configured to measure an air pressure from the one or more taps 202. However, it will be apparent to those skilled in the art will that the pressure sensing device can be any suitable device configured to sense pressure without departing from the scope or spirit of the present disclosure. As shown in FIG. 6, local transducer 204 is configured to send data indicative of an air pressure to a digital communication bus 206. Digital communication bus 206 then sends the data indicative of an air pressure to controller 208. In an embodiment, controller 208 can be a control device programmed to perform operations, such as control device 800 depicted in FIG. 8. Controller 208 can control various actuators and doors based on the data indicative of an air pressure, such as door 120 and actuator 122 of a secondary airflow passage assembly 112.

FIG. 7 is a schematic of an individual instrumented guide vane 400 for an example gas turbine engine according to example embodiments of the present disclosure. Instrumented guide vane 400 can be a variable guide vane 104 or a stationary guide vane 100. As depicted in FIG. 7, instrumented guide vane 400 can be configured in a nonsymmetrical airfoil shape generally having a "tear drop" shape with a leading edge 410, a pressure side 420, and a suction side 430. However, in other example embodiments, the instrumented guide vane 400 may instead define any other suitable symmetrical or nonsymmetrical shape or configuration. In some implementations, leading edge 410 can be configured within engine airflow path 64 such that first portion of air 60 flowing downstream of annular inlet 20 first comes into contact with leading edge 410 before flowing over pressure side 420 and suction side 430 and continuing into LP compressor 22.

Referring still to FIG. 7, one or more leading edge taps 412, pressure side taps 422 and/or suction side taps 432 are integrated into instrumented guide vane 400. The leading edge taps 412, pressure side taps 422, and suction side taps 432 are depicted in phantom. As depicted in FIG. 7, two leading edge inlets 414 are spaced radially along leading edge 410 to allow air from an engine airflow, such as first portion of air 60 and portion 124, to enter leading edge inlet 414 and flow through leading edge tap 412 to a local transducer 204 (not shown in FIG. 7). In another embodiment, a single leading edge inlet 414 and leading edge tap 412 can be integrated into leading edge 410. In another embodiment three or more leading edge inlets 414 and leading edge taps 412 can be integrated into leading edge 410.

Referring still to FIG. 7, two pressure side inlets 424 are spaced axially along pressure side 420 to allow an engine airflow, such as air from first portion of air 60 and portion 124, to enter pressure side inlet 424 and flow through pressure side tap 422 to a local transducer 204 (not shown in FIG. 7). In another embodiment, a single pressure side inlet 424 and pressure side tap 422 are integrated into pressure side 420. In another embodiment three or more pressure side inlets 424 and pressure side taps 422 are integrated into pressure side 420.

Referring still to FIG. 7, two suction side inlets 434 are spaced axially along suction side 430 to allow air from an engine airflow, such as first portion of air 60 and portion 124, to enter suction side inlet 434 and flow through suction side tap 432 to a local transducer 204 (not shown in FIG. 7). The suction side inlets 434 are depicted in phantom. In another embodiment a single suction side inlet 434 and suction side tap 432 are integrated into suction side 430. In another embodiment, three or more suction side inlets 434 and suction side taps 432 are integrated into suction side 430.

Referring still to FIG. 7, in an embodiment, local transducer 204 (not shown) can be configured to provide measurements of a pressure differential between a pressure side tap 422 and a suction side tap 432. In another embodiment, local transducer 204 (not shown) can be configured to provide measurements of absolute pressures from a pressure side tap 422 and a suction side tap 432.

Figure 8:
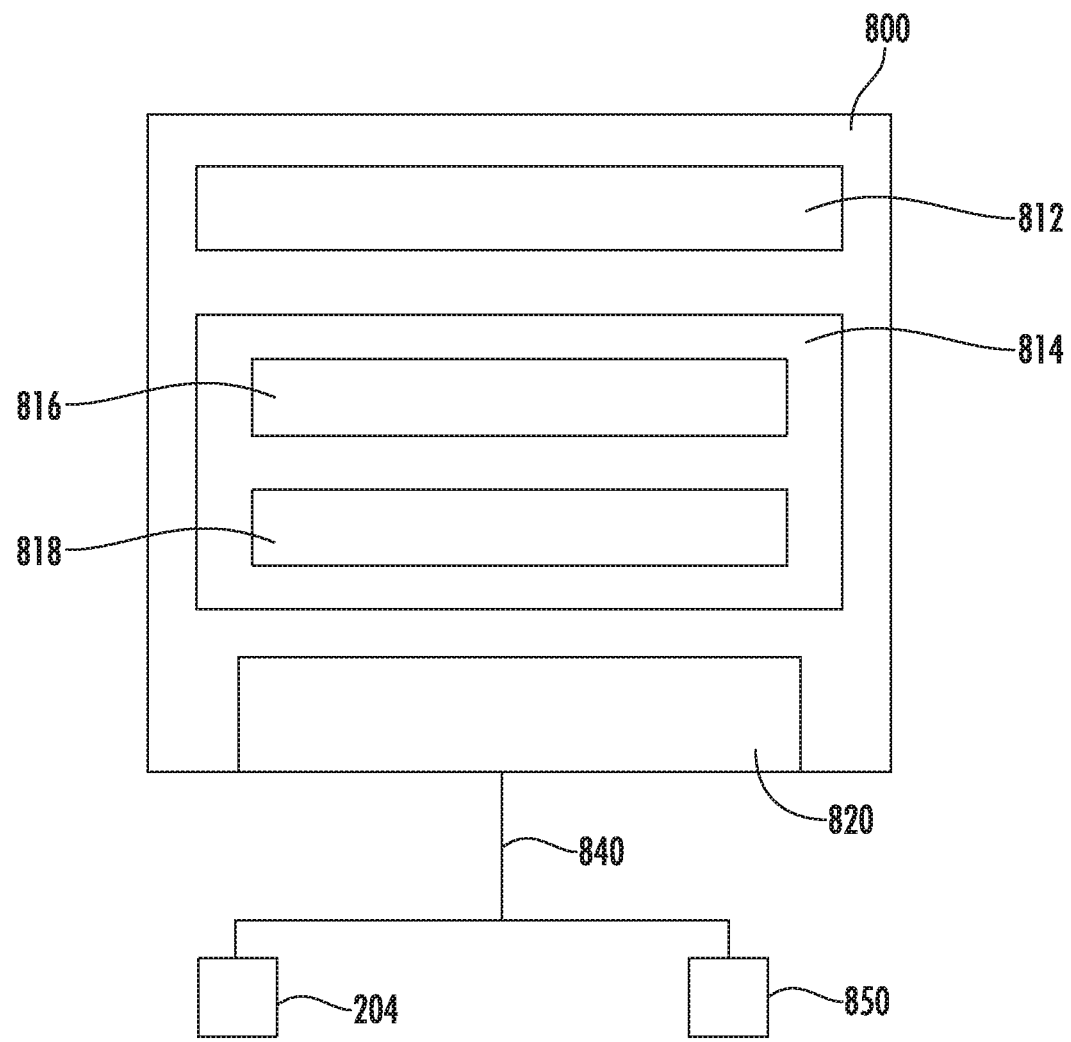
FIG. 8 depicts an example control device used in a control system according to example embodiments of the present disclosure.

FIG. 8 depicts an example control device used in a control system according to example embodiments of the present disclosure. As shown, the control device(s) 800 can include one or more processors 812 and one or more memory devices 814. The one or more processors 812 can include any suitable processing device, such as a microprocessor, microcontroller, integrated circuit, logic device, or other suitable processing device. The one or more memory devices 814 can include one or more computer-readable media, including, but not limited to, non-transitory computer-readable media, RAM, ROM, hard drives, flash drives, or other memory devices.

The one or more memory devices 814 can store information accessible by the one or more processors 812, including computer-readable instructions 816 that can be executed by the one or more processors 812. The instructions 816 can be any set of instructions that when executed by the one or more processors 812, cause the one or more processors 812 to perform operations. The instructions 816 can be implemented in software written in any suitable programming language or can be implemented in hardware. In some embodiments, the instructions 816 can be executed by the one or more processors 812 to cause the one or more processors to perform operations, such as the operations for controlling a secondary airflow passage assembly to adjust airflow distortion in a gas turbine engine as described with reference to FIG. 9.

Referring to FIG. 8, the memory devices 814 can further store data 818 that can be accessed by the processors 812. The data 818 can include, for instance, operating parameters, pressure measurements obtained from the engine airflow path, and other data. The data 818 can also include data associated with models and algorithms used to perform the example methods according to example aspects of the present disclosure, such as models and algorithms for determining a distortion condition.

The control device(s) 800 can further include a communications interface 820. The communications interface 820 can be configured to communicate with aircraft systems over a communication network 840. For instance, the communications interface 820 can receive data indicative of a pressure obtained by a pressure sensing device, such as a tap 202 and local transducer 204. In one embodiment, the communications interface 820 can provide control commands to an engine control system 850 that has one or more actuators to control various components of the gas turbine engine 10, such as, but not limited to, a door 120 or actuator 122 of a secondary airflow passage assembly 112. The communications interface 820 can include any suitable components for interfacing with one more other devices, including for example, transmitters, receivers, ports, controllers, antennas, or other suitable components.

The technology discussed herein makes computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 9:
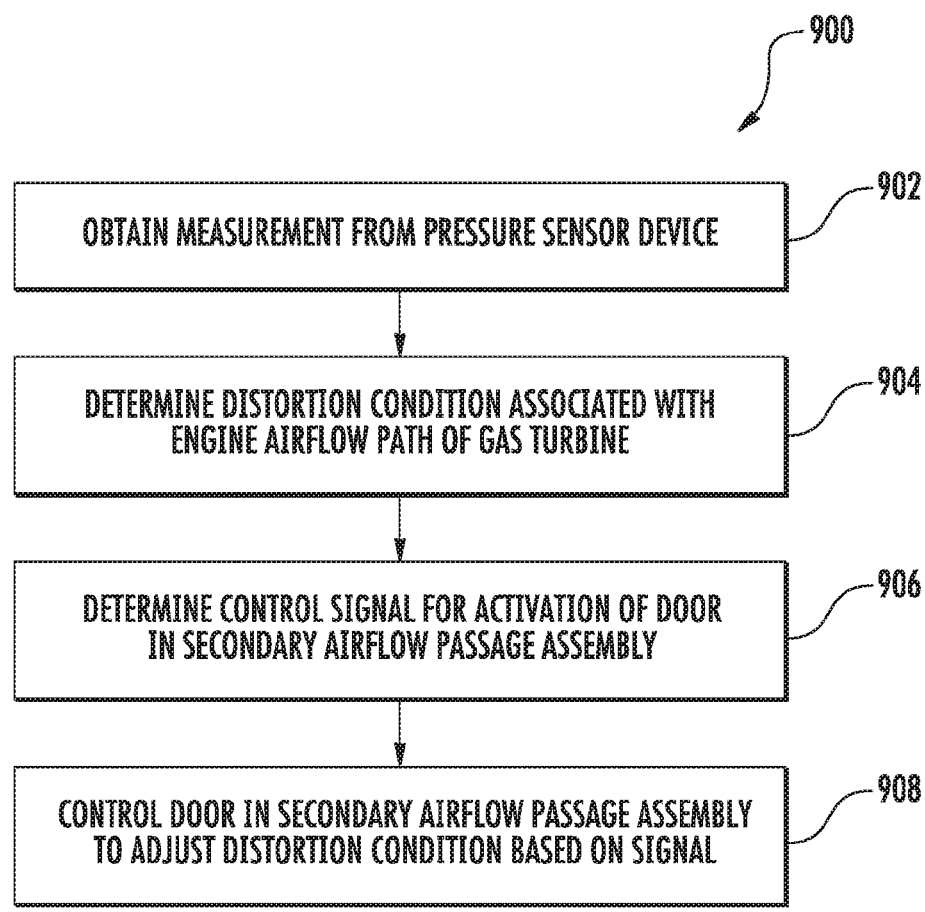
FIG. 9 depicts a flow diagram of an example method according to example embodiments of the present disclosure.

Referring now to FIG. 9, a flow diagram of an example method (900) according to example embodiments of the present disclosure is depicted. FIG. 9 can be implemented by one or more control devices, such as the control device 800 depicted in FIG. 8. In addition, FIG. 9 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (902), the method can include obtaining one or more measurements from one or more pressure sensor devices. The one or more measurements can be obtained by, for example, a local transducer 204 operatively connected to an instrumented guide vane 400 as shown in FIGS. 6 and 7. Alternatively, the one or more measurements can be obtained from any other suitable pressure sensor device.

At (904), the method can include determining a distortion condition associated with the engine airflow path of a gas turbine engine from the one or more measurements. For example, using the one or more measurements, a distortion condition can be determined, such as a local flow disruption in the engine airflow path 64 of the gas turbine engine 10 that causes portions of the LP compressor 22 to be at or below pressures sufficient to cause stall conditions.

At (906), the method can include determining a control signal for activation of a door in a secondary airflow passage assembly based at least in part on the distortion condition assessment. For example, a set point can be determined for a door 120 in a secondary airflow passage assembly 112 to increase the airflow through the secondary airflow passage assembly 112 in order to energize an area of the engine airflow path 64 that is experiencing a local flow disruption. A control signal representing the determined set point of the door 120 can then be sent to an actuator 122 in order to adjust the door 120.

At (908), the method can include controlling the door in the secondary airflow passage assembly to adjust the distortion condition based on the control signal. For example, an actuator 122 can move a door 120 based on the control signal. The door 120 of a secondary airflow passage assembly 112 can be then controlled to open or close to the determined set point to adjust the airflow distortion. In this way, a secondary airflow passage assembly 112 can adjust the airflow distortion associated with the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A core engine of a gas turbine engine, comprising:
   a compressor section, a combustion section, and a turbine section in series flow, the compressor section, combustion section, and turbine section defining at least in part an engine airflow path for the gas turbine engine;
   a casing at least partially enclosing the compressor section, combustion section, and turbine section of the core engine, the casing at least partially exposed to a bypass airflow; and
   a secondary airflow passage assembly, comprising
      a duct, the duct defining an inlet located on the casing, the duct defining an outlet in airflow communication with the engine airflow path, the duct defining an airflow passage extending between the inlet and outlet, and;
      a door moveable between an open position and a closed position, the door allowing at least a portion of the bypass airflow to flow through the airflow passage when in the open position, the door restricting substantially all airflow through the airflow passage when in the closed position.

2. The core engine of claim 1, wherein the door is configured to be controlled based at least in part on an airflow distortion in the engine airflow path.

3. The core engine of claim 2, further comprising:
   one or more pressure sensor devices located at least partially in the engine airflow path for obtaining one or more measurements associated with airflow distortion.

4. The core engine of claim 1, wherein the core engine comprises a plurality of secondary airflow passage assemblies.

5. The core engine of claim 4, wherein the core engine comprises a plurality of pressure sensor devices, wherein each secondary airflow passage assembly is associated with a pressure sensor device configured to obtain one or more measurements associated with the secondary airflow passage assembly.

6. The core engine of claim 4, wherein the core engine defines a circumferential direction, wherein the plurality of secondary airflow passage assemblies is spaced about the circumferential direction of the core engine.

7. The core engine of claim 1, wherein the core engine defines an axial direction, wherein the door is movable at least partially along the axial direction between the open and closed positions.

8. The core engine of claim 1, wherein the door extends at least partially into the bypass airflow in the open position to direct a portion of the bypass airflow into the airflow passage.

9. The core engine of claim 1, wherein the door is additionally movable to an intermediate position between the open and closed positions, wherein the portion of airflow in the intermediate position is less than the portion of airflow in the open position and more than the portion of airflow in the closed position.

10. The core engine of claim 9, wherein the door is movable between the open, closed, and intermediate positions based on signals from a controller to adjust an airflow distortion in the engine airflow path.

11. The core engine of claim 9, wherein the secondary airflow passage assembly comprises one or more actuators operable for moving the door between the open, closed, and intermediate positions.

12. A method for adjusting airflow distortion in a gas turbine engine on an aircraft, the gas turbine engine comprising a compressor section, a combustion section, and a turbine section in series flow, the compressor section, combustion section, and turbine section defining at least in part an engine airflow path, the compressor section, combustion section, and turbine section at least partially enclosed in a casing, the casing at least partially exposed to a bypass airflow, the method comprising:
    determining, by one or more control devices, an airflow distortion condition associated with the engine airflow path; and
    controlling, by the one or more control devices, a door of a secondary airflow passage to adjust the airflow distortion condition of the gas turbine engine, the secondary airflow passage assembly comprising a duct, the duct defining an inlet located on the casing, the duct defining an outlet in airflow communication with the engine airflow path, the duct defining an airflow passage extending between the inlet and outlet, the door allowing at least a portion of the bypass airflow to flow through the airflow passage when in the open position, the door restricting substantially all airflow through the airflow passage when in the closed position.

13. The method of claim 12, wherein the door is additionally movable to an intermediate position between the open and closed position, wherein the portion of airflow in the intermediate position is less than the portion of airflow in the open position and more than the portion of airflow in the closed position.

14. The method of claim 13, wherein controlling the door of the secondary airflow passage assembly comprises moving the door between the open, closed, and intermediate positions.

15. The method of claim 12, wherein controlling the door of a secondary airflow passage assembly to adjust the airflow distortion condition comprises controlling the door of a secondary airflow passage assembly to reduce the airflow distortion condition.

16. The method of claim 12, wherein determining the airflow distortion condition associated with the engine airflow path comprises obtaining one or more measurements using one or more pressure sensor devices.

17. The method of claim 12, wherein controlling the door comprises sending a control signal to one or more actuators operable for moving the door.

18. A gas turbine engine system for an aircraft comprising:
    a compressor section, a combustion section, and a turbine section in series flow and defining at least in part an engine airflow path,
    a casing at least partially enclosing the compressor section, combustion section, and turbine section, the casing at least partially exposed to a bypass airflow;
    a secondary airflow passage assembly, comprising a duct and a door, the duct defining an inlet located on the casing, the duct defining an outlet in airflow communication with the engine airflow path, the duct defining an airflow passage extending between the inlet and outlet, the door moveable between an open position and a closed position, the door allowing at least a portion of the bypass airflow to flow through the airflow passage when in the open position, the door restricting substantially all airflow through the airflow passage when in the closed position; and
    a controller operably connected to the door of the secondary airflow passage assembly, the controller comprising one or more processors and one or more memory devices located on an aircraft, the one or more memory devices storing instructions that when executed by the one or more processors cause the one or more processors to perform operations, the operations comprising:
        determine an airflow distortion condition within the engine airflow path; and
        control the door to adjust an airflow through the airflow passage to adjust the determined airflow distortion condition.

19. The gas turbine engine system of claim 18, wherein the core engine comprises one or more pressure sensor devices located at least partially in the engine airflow path for obtaining one or more measurements for determining the airflow distortion condition.

20. The gas turbine engine system of claim 17, wherein the door is additionally movable to an intermediate position between the open and closed position, wherein the portion of airflow in the intermediate position is less than the portion of airflow in the open position and more than the portion of airflow in the closed position.

* * * * *